(12) United States Patent
Wilson et al.

(10) Patent No.: US 12,320,707 B2
(45) Date of Patent: Jun. 3, 2025

(54) PHONON DISRUPTORS FOR INCREASED THERMAL RESISTANCE WITHOUT SACRIFICING ELECTRICAL SIGNAL QUALITY IN THERMAL SENSORS USING ALLOY AND INTERMETALLIC MATERIALS

(71) Applicant: U.S. Army Combat Capabilities Development Command, Army Research Laboratory, Adelphi, MD (US)

(72) Inventors: Adam A. Wilson, Columbia, MD (US); Dennis L. Waldron, Chesapeake Beach, MD (US); Cory R. Knick, Troy, OH (US); Darin J. Sharar, Silver Spring, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 493 days.

(21) Appl. No.: 17/741,185

(22) Filed: May 10, 2022

(65) Prior Publication Data
US 2022/0373395 A1 Nov. 24, 2022

Related U.S. Application Data

(63) Continuation-in-part of application No. 17/317,211, filed on May 11, 2021.

(51) Int. Cl.
*G01J 5/20* (2006.01)
*G01J 5/00* (2022.01)

(52) U.S. Cl.
CPC ......... *G01J 5/20* (2013.01); *G01J 2005/0077* (2013.01); *G01J 2005/202* (2013.01)

(58) Field of Classification Search
CPC ........ G01K 2213/00; G01K 7/16; G01K 7/42; G01J 5/023; G01J 5/046; G01J 5/20; G01J 5/024; G01J 5/06; G01J 2005/202; G01J 2005/0077
See application file for complete search history.

(56) References Cited

U.S. PATENT DOCUMENTS

| | | | | |
|---|---|---|---|---|
| 5,629,665 | A | * | 5/1997 | Kaufmann ............. H10K 30/00 338/18 |
| 2006/0231761 | A1 | * | 10/2006 | Peytavit ................... G01J 5/20 250/338.1 |

(Continued)

OTHER PUBLICATIONS

R. Gurunathan, et al., "Alloy scattering of phonons. Materials Horizons," 7(6), 2020 pp. 1452-1456.
(Continued)

*Primary Examiner* — Dani Fox
*Assistant Examiner* — Soorena Kefayati
(74) *Attorney, Agent, or Firm* — Eric B. Compton

(57) ABSTRACT

Sensor interconnects and supports and methods of making them utilize phonon disruptors for increased thermal resistance while maintaining acceptable electrical signal quality in materials. Phonon disruptors include the use of an electrically conductive alloy material or intermetallic material of at least two or more elements to promote scattering of phonons. These materials are selected to scatter heat carriers while allowing electrons to pass through the material.

22 Claims, 7 Drawing Sheets

(56) References Cited

U.S. PATENT DOCUMENTS

| | | | | |
|---|---|---|---|---|
| 2009/0140147 | A1* | 6/2009 | Skidmore | H01L 27/14601 250/338.4 |
| 2010/0243896 | A1* | 9/2010 | Geneczko | G01J 5/023 250/492.3 |
| 2011/0057107 | A1* | 3/2011 | Agnese | G01J 5/20 250/338.3 |
| 2013/0146773 | A1* | 6/2013 | Ouvrier-Buffet | G01J 5/0837 250/353 |
| 2013/0161515 | A1* | 6/2013 | Park | G01J 5/023 250/338.1 |
| 2014/0267756 | A1* | 9/2014 | Gousev | G01J 5/20 438/54 |
| 2016/0091371 | A1* | 3/2016 | Palanchoke | G01J 5/20 250/349 |
| 2017/0137281 | A1* | 5/2017 | Favier | H10F 71/00 |
| 2017/0314995 | A1* | 11/2017 | Rocznik | G01J 5/20 |
| 2019/0145829 | A1* | 5/2019 | Sugino | G01J 5/024 374/130 |
| 2019/0277702 | A1* | 9/2019 | Alemán | G01J 5/20 |
| 2020/0166408 | A1* | 5/2020 | Aliane | G01J 5/0245 |
| 2020/0191659 | A1* | 6/2020 | Aifer | G01J 5/024 |
| 2020/0309603 | A1* | 10/2020 | Varpula | H01L 25/18 |
| 2021/0181025 | A1* | 6/2021 | Becker | H01L 27/14683 |
| 2021/0302237 | A1* | 9/2021 | Takahashi | H10N 15/00 |

OTHER PUBLICATIONS

R. G. Delatorre et al., "Thermoelectric properties of electrodeposited CuNi alloys on Si," Journal of applied physics, 93(10), 2003, pp. 6154-6158.

Y. Terada, et al., "Thermal conductivity of intermetallic compounds with metallic bonding. Materials transactions," 43(12), 2002. pp. 3167-3176.

G. Chen, Chapter 7: "Classical Size Effects" in Nanoscale energy transport and conversion: a parallel treatment of electrons, molecules, phonons, and photons. Oxford University Press. 2005. pp. 287-288.

S. Mu, et al., Uncovering electron scattering mechanisms in NiFeCoCrMn derived concentrated solid solution and high entropy alloys. npj Computational Materials, 5(1), 2019 pp. 1-8.

Z. Tong, and H. Bao, "Decompose the electron and phonon thermal transport of intermetallic compounds NiAl and Ni3Al by first-principles calculations," International Journal of Heat and Mass Transfer, 117, 2018, pp. 972-977.

D. G. Cahill, "Analysis of heat flow in layered structures for time-domain thermoreflectance,". Review of scientific instruments, 75(12), 2004, pp. 5119-5122.

Warzoha, R.J., Wilson, A.A., Donovan, B.F., Smith, A.N., Vu, N., Perry, T., Li, L., Miljkovic, N. and Getto, E., "A numerical fitting routine for frequency-domain thermoreflectance measurements of nanoscale material systems having arbitrary geometries," Journal of Applied Physics, 129(3), 2021, p. 035103.

Warzoha, R.J., Vu, N.T., Donovan, B.F., Cimpoiasu, E., Sharar, D.J., Leff, A.C., Wilson, A.A. and Smith, A.N., "Grain growth-induced thermal property enhancement of NiTi shape memory alloys for elastocaloric refrigeration and thermal energy storage systems," International Journal of Heat and Mass Transfer, 154, 2020, p. 119760.

H. Matsumoto, "Irreversibility in transformation behavior of equiatomic nickel-titanium alloy by electrical resistivity measurement," Journal of alloys and compounds, 368(1-2), 2004, pp. 182-186.

Hite, N., Sharar, D.J., Trehern, W., Umale, T., Atli, K.C., Wilson, A.A., Leff, A.C. and Karaman, I., "NiTiHf shape memory alloys as phase change thermal storage materials," Acta Materialia, 218, 2021, p. 117175.

P. Guo, et al., "A review of germanium-antimony-telluride phase change materials for non-volatile memories and optical modulators," Applied sciences, 9(3), 2019, p. 530.

E. A. Scott, et al., "Thermal conductivity of (Ge2Sb2Te5) 1-x C x phase change films," Journal of Applied Physics, 128(15), 2020, p. 155106.

X. Wang, et al., "Thermal modeling of laser-annealing-induced crystallization of amorphous NiTi thin films," Applied Physics A, 90(4), 2008, pp. 689-694.

X. Huang, et al., "Amorphous nickel titanium alloy film: a new choice for cryo electron microscopy sample preparation," Progress in biophysics and molecular biology, 156, 2020, pp. 3-13.

Matweb Material Datasheet for TiN coatings. Accessed on May 4, 2022. URL: https://www.matweb.com/search/datasheet_print.aspx?matguid=fbf753c500949db95e502e043f9a404.

AZO Materials Datasheet for ASIS 310 Stainless Steel. Accessed on May 4, 2022. URL: https://www.azom.com/article.aspx?ArticleID=4392.

M. Yamasaki, et al., "Thermal diffusivity and conductivity of Zr55Al10Ni5Cu30 bulk metallic glass," Scripta Materialia, 53(1), 2005, pp. 63-67.

U, Harms, et al. "Thermal conductivity of Pd40Ni40-xCuxP20 metallic glasses," Scripta Materialia, 47(6), 2002, pp. 411-414.

Warzoha, R.J., Wilson, A.A., Donovan, B.F., Donmezer, N., Giri, A., Hopkins, P. E., Choi, S., Pahinkar, D., Shi, J., Graham, S. and Tian, "Applications and impacts of nanoscale thermal transport in electronics packaging." Journal of Electronic Packaging, 143(2), 2021, p. 020804.

U.S. Appl. No. 17/317,211, titled "Phonon Disruptors for Increased Thermal Resistance Without Sacrificing Electrical Signal Quality in Thermal Sensors," filed on May 11, 2021.

* cited by examiner

PHONON DISRUPTORS FOR INCREASED THERMAL RESISTANCE WITHOUT SACRIFICING ELECTRICAL SIGNAL QUALITY IN THERMAL SENSORS USING ALLOY AND INTERMETALLIC MATERIALS

RELATED APPLICATION DATA

This application is a continuation-in-part (CIP) of U.S. patent application Ser. No. 17/317,211, titled "PHONON DISRUPTORS FOR INCREASED THERMAL RESISTANCE WITHOUT SACRIFICING ELECTRICAL SIGNAL QUALITY IN THERMAL SENSORS," filed on May 11, 2021, herein incorporated by reference in its entirety for all purposes.

GOVERNMENT INTEREST

The embodiments herein may be manufactured, used, and/or licensed by or for the United States Government without the payment of royalties thereon.

BACKGROUND

Technical Field

The embodiments herein generally relate to materials, structures and methods for increasing thermal resistance in thermal sensor mechanical/electrical interconnects while maintaining acceptable electrical signal quality.

DESCRIPTION OF THE RELATED ART

Conventional thermal sensors rely on radiated heat from the environment to be detected at a sensitive detection pixel or microbolometer, which is designed to be thermally isolated from the surrounding packaging and integrated circuit. Arrays of microbolometers are used in thermal imaging devices to form a thermal image detection array, hence the use of detection pixel, or pixel for short, to refer to a microbolometer device. The microbolometer has a detector or sensor element, which has one or more electrical properties, such as resistance or voltage for example, that are temperature dependent. To achieve this, these sensors are generally vacuum packaged to prevent convective losses, and prior art has proposed that the detection pixel be connected to circuitry via long, narrow leg structures. The narrower and longer the leg structures, the more thermal resistance is present in each pixel. As a result, the sensor would be more sensitive to thermal radiation.

Thermal sensors have historically relied on detector elements which are actively cooled to cryogenic temperatures to reduce ambient thermal noise. Active cooling significantly increases operating power demand, adds bulk and expense compared with uncooled alternatives. In the past two decades, uncooled microbolometers have emerged as competitive alternatives, required no active cooling and made from materials which significantly reduce cost, size, weight, and operating power requirements.

At present, uncooled microbolometers rely on exclusively geometric control to increase the thermal resistance of the pixel. Increased thermal resistance leads to increased sensitivity (temperature rise), rising as the square root of the thermal resistance. This means that the smallest temperature rise that can be detected by the pixel corresponds to a smaller amount of thermal energy absorbed at the pixel as the thermal resistance of the pixel is increased, thus increasing the thermal resistance of the pixel enhances the sensitivity of the pixel. This is one of the key performance metrics for uncooled microbolometers. More specifically, manufacturers of uncooled microbolometers today rely on adding more length or thinning electrical/mechanical interconnects to add thermal resistance to the interconnects, but this typically compromises mechanical rigidity of the structure. A reduction in mechanical rigidity makes these structures prone to stress-induced deformation and warping, which leads to as-fabricated devices touching down to the substrate (rather than being suspended). The result is an inoperable microbolometer. Thus, there is a need to increase the thermal resistance without requiring thinning or lengthening the structures.

The aforementioned '211 parent application teaches various methodologies to increase thermal resistance without sacrificing electrical signal quality in thermal sensors. Among other things, it teaches introducing size effects and intermetallic site defects to achieve ultra-low thermal conductivity and heat capacity while maintaining electrical continuity and ohmic contacts in a material that may be patterned and integrated into the previously disclosed thermally isolated temperature sensor leg structures.

SUMMARY

The embodiments herein utilize phonon disruptors of material systems for increased thermal resistance while maintaining acceptable electrical signal quality in materials. Phonon disruptors include the use of an electrically conductive alloy material or intermetallic material of at least two or more elements to promote scattering of phonons. These materials are selected to scatter heat carriers while allowing electrons to pass through the material.

In some embodiments herein, by design, thermal properties are tailored to the desired application and sensitivity. The embodiments herein utilize phonon scattering materials to tailor thermal resistance in thermal sensors. More specifically, we use alloy scattering, size effects, and a combination thereof to these ends.

According to some embodiments, a thermal sensor device comprises a substrate; read-out circuitry; a thermal sensor element supported over the substrate; and a conductive path of enhanced thermal resistance extending between the thermal sensor element and the read-out circuitry configured for conducting an electrical signal between the thermal sensor element and the read-out circuitry. The conductive path of enhanced thermal resistance has a thermal resistance and comprises at least one phonon transport disrupting structure configured to increase the thermal resistance of the conductive path of enhanced thermal resistance compared to a similar conductive path, which would be made of another material, for conducting an electrical signal between the thermal sensor element and the read-out circuitry. Thus, the comparative path would lack the phonon transport disrupting structure.

The at least one phonon transport disrupting structure comprises an electrically conductive alloy material or intermetallic material of at least two or more elements to specifically promote scattering of phonons. In some implementations and embodiments, the material of the at least one phonon transport disrupting structure has an electrical conductivity ($\sigma$) no less than about $1.9 \times 10^5$ S/m and a thermal conductivity ($\kappa$) no more than about 22 $Wm^{-1}K^{-1}$. Although, other thresholds for one or both of $\kappa$ and $\sigma$ can be used.

According to other embodiments, thermal sensor device comprises: a substrate; read-out circuitry; a thermal sensor element; and a conductive path of enhanced thermal resistance extending between the thermal sensor element and the read-out circuitry configured for conducting an electrical signal between the thermal sensor element and the read-out circuitry. The conductive path of enhanced thermal resistance has a thermal resistance and comprises an electrically conductive alloy material or intermetallic material of at least two or more elements having an electrical conductivity ($\sigma$) no less than about $1.9 \times 10^5$ S/m and a thermal conductivity ($\kappa$) no more than about 22 $Wm^{-1}K^{-1}$.

In some implementations, the alloy material or the intermetallic material may be a binary alloy composed of only two elements. For instance, the material may comprise: $Ni_xTi_{1-x\ 0.45<x<0.55}$, $Co_xGa_{1-x\ x\approx 0.5}$, or $Al_xFe_{1-x\ x\approx 0.5}$, if an intermetallic, or a-NiTi, CuNi, or TiN, if an alloy, as examples. In other implementations, the alloy material or the intermetallic material may be a ternary, quaternary or higher alloy composed of three, four or more elements, wherein the additional element or elements beyond two increase scattering and transport disruption of the phonons through the at least one conductive path of enhanced thermal resistance compared to a binary material composed of only two elements. For instance, the material may comprise: NiTiHf, NiTiCoHf, or hcp-GeSbTe, if an intermetallic, or $Fe_{0.55}Ni_{0.2}Cr_{0.25}$, $Zr_{0.55}Al_{0.1}Ni_{0.05}Cu_{0.3}$, $Pd_{0.4}Ni_{0.4}P_{0.2}$, if a binary alloy, as examples. More, the alloy material or the intermetallic material may be formed of only metal atoms in select embodiments.

The conductive path of enhanced thermal resistance may be provided as a homogenous film or a trace. In some cases, the material is an intermetallic having a B1, B2, B3, B4, B10, B17, B19 or B20 crystal packing structure. The material of the conductive path can be further clad with a cladding material providing additional benefits.

The thermal resistance and electrical conductivity of the electrically conductive alloy material or the intermetallic material may be judiciously determined using the Klemens analytical model for the thermal resistance and the Nordheim rule for electrical conductivity, respectively. For the former, the thermal resistance of the electrically conductive alloy material or the intermetallic material may be determined according to the following equation:

$$\frac{k_L}{k_0} = \frac{\tan^{-1}u}{u}, \text{ where } u = \left(\frac{(6\pi^5 V^2)^{\frac{1}{3}}}{2k_B v_s}k_0\Gamma\right)^{1/2}, \text{ where } \Gamma = \frac{\langle \Delta M^2\rangle}{\langle M^2\rangle},$$

$\langle \Delta M^2\rangle$ is the average mass variance, $\langle M^2\rangle$ is the average mass squared, $k_0$ is the thermal conductivity of a pure material, $k_L$ is the lattice thermal conductivity of the alloy, V is the volume of a unit cell of the compound, and $v_s$ is the average speed of sound in the material.

For the latter, the electrical conductivity of the electrically conductive alloy material or the intermetallic material is determined according to the following equation:

$$\sigma = \frac{1}{CX(1-X)},$$

where C is the Nordheim coefficient of one material in a solution of the other and X is the atomic fraction of the element being added to the solution. In some cases, for material concentrations beyond the solubility limit, two phase solutions exist, which may be determined according to the following equation: $\sigma=\sigma_A X+\sigma_B(1-X)$, where $\sigma_A$ and $\sigma_B$ are the electrical conductivity of a first material A and second material B, respectively.

The phonon mean free path may be greater than the electron mean free path through the conductive path of enhanced thermal resistance. The thickness of the conductive path of enhanced thermal resistance may be judiciously determined by a Fuchs-Sondheimer solution. For instance, a thickness $d_{film}$ of the conductive path of enhanced thermal resistance may be determined according to the following equations:

$$\frac{k_{film}}{k_{bulk}} = 1 - \frac{3\xi_{phonon}(1-p)}{2}\int_0^1 (\mu-\mu^3)\frac{1-\exp\left(-\frac{\xi_{phonon}}{\mu}\right)}{1-p\exp\left(\frac{\xi_{phonon}}{\mu}\right)}d\mu,$$

conductivity of the thin film, $k_{bulk}$ is the corresponding bulk thermal conductivity, p is the fraction of energy carriers specularly reflected at the interface, $\mu$ is a variable of integration, and $\zeta_{phonon}=d_{film}/\Lambda_{phonon}$, where $\Lambda_{phonon}$ is the phonon mean free path; and $$\frac{\sigma_{film}}{\sigma_{bulk}} = 1 - \frac{3\xi_{electron}(1-p)}{2}\int_0^1 (\mu-\mu^3)\frac{1-\exp\left(-\frac{\xi_{electron}}{\mu}\right)}{1-p\exp\left(-\frac{\xi_{electron}}{\mu}\right)}d\mu,$$

where $\sigma_{film}$ a is the electrical conductivity of the thin film, $\sigma_{bulk}$ is the corresponding bulk electrical conductivity, p is the fraction of energy carriers specularly reflected at the interface, $\mu$ is a variable of integration, and $\zeta_{electron}=d_{film}/\Lambda_{electron}$, where $\Lambda_{electron}$ is the electron mean free path. The thickness $d_{film}$ is preferably selected so that $\Lambda_{phonon}>d_{film}>\Lambda_{electron}$. For some implementations of the above equations, $\Lambda_{electron}$ is about 3 nm and $\Lambda_{phonon}$ is about 30 nm; and p is 0 as non-limiting variable examples in the above equations.

According to further embodiments, we present methods for forming a conductive path of enhanced thermal resistance in an electronic device. The methods may comprise: selecting an electrically conductive alloy material or intermetallic material of at least two or more elements to promote scattering of phonons; and forming, as part of a conductive path of enhanced thermal resistance extending between a thermal sensor element and read-out circuitry, a phonon transport disrupting structure from the selected electrically conductive alloy material or intermetallic material for conducting an electrical signal between the thermal sensor element and the read-out circuitry. The electrically conductive alloy material or intermetallic material may be selected to have a thermal conductivity ($\kappa$) no more than about 22 $Wm^{-1}K^{-1}$ and an electrical conductivity ($\sigma$) no less than about $1.9 \times 10^5$ S/m. Although, other thresholds for one or both of $\kappa$ and a can be used. The conductive path of enhanced thermal resistance may be a film formed, for instance, by: physical vapor deposition; chemical vapor deposition, evaporation, epitaxial growth, pulsed laser deposition, selective laser melting/sintering, or arc melt spinning. Or the conductive path of enhanced thermal resistance may be a conductive trace which is patterned and etched or milled.

Some embodiments herein provide structures and methods by which the thermal resistance of the interconnects, supports, and/or "legs" of thermal sensors will be increased through better control tailoring of heat flow, by intentionally introducing phonon scattering sites, while not significantly inhibiting electrical flow. Moreover, this will be accomplished without requiring excessive thinning or lengthening of structures (as is currently done). This will enable faster, more sensitive, higher resolution thermal sensing compared with the existing state of the art and the fabrication of devices with higher operability.

These and other aspects of the embodiments herein will be better appreciated and understood when considered in conjunction with the following description and the accompanying drawings. It should be understood, however, that the following descriptions, while indicating exemplary embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION

Figure 1A:
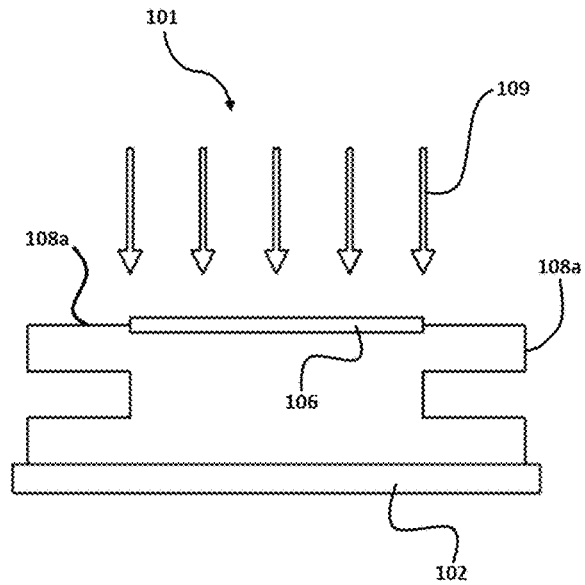
FIG. 1A is a schematic diagram illustrating a prior art temperature sensing device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

This application builds upon the methodologies disclosed in the '211 parent application to provide additional new photon disruptor methodologies to practically achieve thermally isolated temperature sensor with high electrical conductivity. They are amenable to better control to manipulate and limit heat flow without sacrificing electrical properties.

These include, namely, alloy scattering and the combination of alloy scattering and size effects. Alloy scattering is achieved by intentionally introducing phonon scattering sites in the conductive paths, while not significantly inhibiting electrical flow. Moreover, this will be accomplished without requiring excessive thinning or lengthening of structures (as is currently done). This will enable faster, more sensitive, higher resolution thermal sensing compared with state of the art and also a path towards fabricating devices with higher operability.

Before we begin discussion of embodiments of the invention, we wish to briefly discuss the physics behind the phonon disruptor means for increasing thermal resistance without sacrificing electrical conductivity. We discuss two types of particles herein: "phonons" which are quasi-particles (or quantum) associated with an energy wave such as sound or a vibration of a crystal lattice, and "electrons" which are elementary subatomic particles whose electric charge is negative. Phonons are associated with thermal conductivity. More particularly, phonons, at least partially, transfer heat through the conductive path. Phonon-mediated heat conduction relies on vibrations of atoms in a crystal lattice.

Electrons are responsible for electrical conductivity through the conductive path. Along with electrical conductivity, the electrons also carry heat. The total thermal conductivity is thus the sum of the contributions from the electron portion and phonon portion.

Embodiments of the present invention use of thin films of electrically conductive alloy materials or intermetallic materials with more than one element to promote phonon disruption to intentionally reduce thermal conductance in thermally isolated temperature sensors. In other words, we provide for more improved thermal resistance. This leads to a reduction in sensor temperature losses while simultaneously maintaining electrical conductance to allow signal to be measured. The materials may be configured as thin films or traces in some implementations and embodiments. The basic premise is to reduce thermal conductance and thermal capacitance in such detection platforms by using intermetallics and alloy material systems.

These new methodologies provide practically means to achieve thermally isolated temperature sensor. These enable manufacturers to better able to control and manipulate heat flow.

The electrically conductive alloy materials or intermetallic materials material systems presented herein exhibit substantial phonon scattering due to phonon-phonon mechanisms arising to the different sizes and densities of the atoms in the crystal lattice, electron-phonon mechanisms, phonon and electron scattering at grain boundaries, and phonon-site defect scattering, which arises due to the inclusion of site-substituting defects and/or missing atoms from lattice sites. These are all controllable and tailorable based on the elements and compositions selected in the materials to be used. Because the system is complex and first principles calculations are intractable for this system, we are employing empirical-based machine learning methods to estimate and predict the relationship between elemental composition, film growth conditions, and values of thermal conductivity, heat capacity, and electrical conductivity, with the ultimate limit being that phonon-mediated heat transport is completely removed from the system, and electrical conductivity being optimized such that thermal conductivity arising due to electrons does not reduce sensitivity or speed of the thermally isolated temperature sensor device.

Thermally-isolated radiative temperature sensors rely on having an absorbing platform, a high degree of thermal isolation between platform and circuitry, and an acceptable degree of electrical conduction to enable detection at the circuitry. Exemplary sensors include a microbolometer and a convection-based gyroscope accelerometer.

Herein, we described a thermally-isolated radiative temperature sensor which is a microbolometer as will be discussed herein for thermal sensor device 100. But the methodologies and features we disclosed can certainly be applied to many other sensors and device in other embodiments. Applications for enhancement of thermal insulation surrounding temperature-sensitive devices may include but are not limited to: quantum sensors, topologically-enabled devices, and temperature-driven phase-change materials.

FIG. 1A depicts a prior art microbolometer 101, which is characterized by long, meandering leg structures 108a. Uncooled microbolometers rely on thermal isolation and electrical continuity between the thermal sensor element and the read-out circuitry. In the current state-of-the-art designs, thermal isolation is achieved by long, meandering leg structures 108a, which lengthens the conduction path to increase thermal resistance.

If thermal resistance along the path of electrical continuity could be significantly increased (without suffering deleterious effects on electrical properties), measured signal could be significantly enhanced, and the legs could be shortened, or altogether abandoned, leading to much-improved resolution, higher pixel density, and increased stiffness which avoids pixel sagging and unintended thermal shorting. The embodiments herein provide for significant increases in thermal resistance by disrupting phonon-mediated heat conduction in these material systems, while maintaining electrical continuity. Phonon-mediated heat conduction relies on vibrations of atoms in a crystal lattice.

Figure 1B:
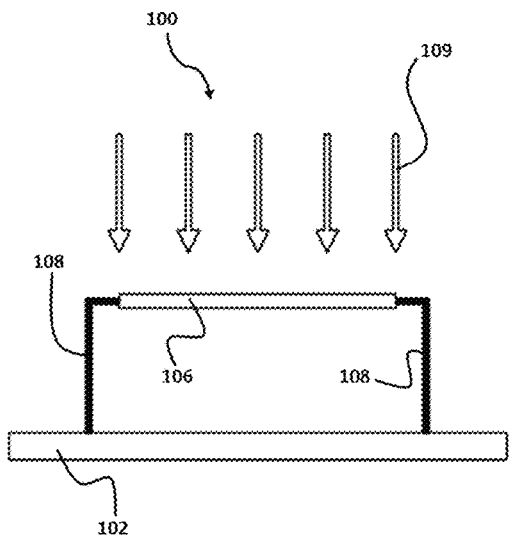
FIGS. 1B-1E are schematic diagrams illustrating a temperature sensing device in accordance with an example embodiment disclosed herein.

Referring to FIGS. 1B-1E, some embodiments disclosed herein are directed to a thermal sensor device 100, which includes a substrate 102, read-out circuitry 104, a thermal sensor element 106, and at least one conductive path 108. More particularly, FIG. 1B depicts a novel microbolometer 100 in accordance with some of the embodiments disclosed herein, which allows shorter and thicker interconnects and higher sensitivity operation by leveraging manipulation of the phonon behavior of the interconnect structure and/or material.

The novel device structure 100 may allow for shorter and thicker interconnects and higher sensitivity operation by leveraging manipulation of the phonon behavior of the system. A more detailed description of the novel disruption strategies for phonon-mediated heat transport is described in the ensuing text and FIGS. 1C-1E along with quantitative estimates for the limits of the advantages that can be actualized by these approaches.

In the conventional design depicted in FIG. 1A, thermal isolation is achieved by long, meandering leg structures 108a which lengthens the conduction path between the substrate 102 (which includes read-out circuitry 104) and the thermal sensor element 106 to increase thermal resistance. If thermal resistance along the path of electrical continuity could be significantly increased (without suffering deleterious effects on electrical properties), measured signal could be significantly enhanced, and the legs could be shortened, or altogether abandoned, leading to much-improved resolution, higher pixel density, and increased stiffness which avoids pixel sagging and unintended thermal shorting.

The substrate 102 may, for example, be made of silicon. The substrate 102 may, for example, be a silicon die cut from a silicon wafer. It is contemplated that the substrate may also be made of other semiconductors including compound semiconductors. Usually, arrays of thermal sensor devices 100 and thermal sensor elements 106 are provided on the substrate 102. In the illustrated example, the thermal sensor devices 100 is a configured as a microbolometer.

As shown in FIG. 1B, we can form the conductive path 108, while in the bulk, from material(s) that is/are configured to cause scattering of both phonons and electrons, inhibiting the transport of both electrons and phonons through the bulk, but still maintaining a conductive path for electrons.

Figure 1C:
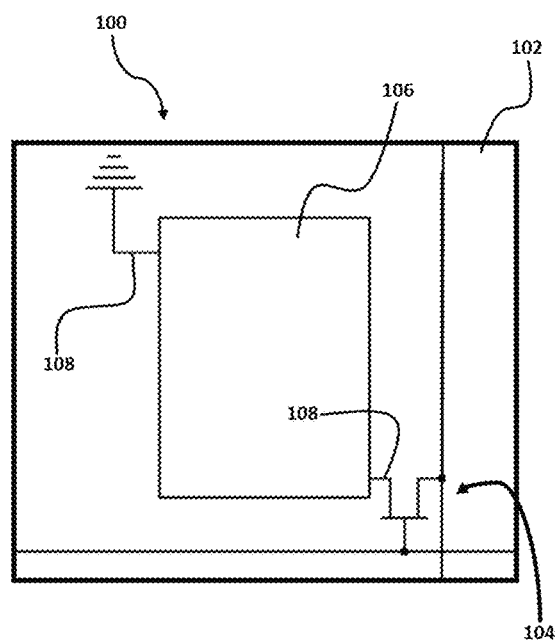

FIG. 1C further shows that read-out circuitry 104 may be integrated into the substrate 104, or it may be provided on a separate die. The substrate 102 having the array of devices 100 thereon may be vacuum packaged to prevent convective heat losses.

The read-out circuitry 104 may include at least some integrated circuit (IC) elements that may include row and column interconnects, complementary metal-oxide-semiconductor (CMOS) field-effect transistors, metal-oxide-semiconductor field-effect transistors (MOSFETs), multiplexers, integrators, capacitors, and bipolar junction transistors to name a few. The above list of circuit elements is by no means intended to exhaustive or limiting and is only intended for providing examples of circuit element that may be included in the read-out circuitry 104. The read-out circuitry 104 may include any number of other circuit elements. The read-out circuitry 104 used with arrays of microbolometers is well-known and will not be discussed here in detail. In the illustrated example, a MOSFET, a ground connection, and some wiring are shown as a diagrammatic representation of the read-out circuitry 104.

The thermal sensor element 106 is supported or suspended over the substrate 102 at a height (approximately 2 μm in some examples) above the substrate 102 by at least one electrically conductive leg that constitutes the at least one conductive path 108 in some embodiments. In the illustrated embodiment, there are two support legs that form two conductive paths 108. Accordingly, the conductive paths 108 function both to suspend the thermal sensor element 106 above the substrate 102 and to provide for electrical communication between the thermal sensor element 106 and the read-out circuitry 104. The conductive paths 108 are of enhanced thermal resistance and extend between the thermal sensor element 106 and the read-out circuitry 104. Accordingly, the conductive paths 108 are configured for conducting electrical signals between the thermal sensor element 106 and the read-out circuitry 104, while providing enhanced thermal resistance that increases the sensitivity of the thermal sensor device 100 to thermal radiation 109.

Each of the conductive paths 108 of enhanced thermal resistance comprises a at least one phonon transport disrupting structure, also referred to herein as a phonon scattering structure or site formed of electrically conductive alloy or intermetallic material(s). The material of the phonon transport disrupting structure is configured to increase the thermal resistance of each conductive path 108 of enhanced thermal resistance as compared to a similar conductive path that lacks the phonon transport disrupting material structure. The similar conductive path would be made of the same materials, would be configured for conducting an electrical signal between the thermal sensor element 106 and the read-out circuitry 104, and would be identical in geometry to the corresponding conductive path 108 of enhanced thermal resistance.

In some embodiments herein, the conductive paths 108 may solely serve the function of providing for electrical communication between the thermal sensor element 106 and the read-out circuitry 104, while the structural support for suspending the thermal sensor element 106 over the substrate 102 may be provided by thermally insulating legs. The conductive paths 108 may be formed on the thermally insulating legs, or the conductive paths 108 may be located adjacent to or apart from the thermally insulating legs. Even in embodiments where the conductive paths 108 solely serve the function of providing for electrical communication between the thermal sensor element 106 and the read-out circuitry 104, increasing the thermal resistance of the conductive paths 108 will enhance the sensitivity of the thermal sensor device 100 by reducing the rate of conductive heat loss from the thermal sensor element 106.

The read-out circuitry 104 allows the value of the temperature-dependent electrical characteristic of the thermal sensor element 106 (e.g., voltage, resistance, etc.), which is indicative of the current temperature of the thermal sensor element 106, to be read out to image processing circuitry that produces an image array of pixels. The value of each image pixel would code for the temperature detected by the thermal sensor element 106 of the corresponding thermal sensor device 100. A thermal image can be obtained from the array of thermal sensor devices 100 in this way. The image processing circuitry, also referred to as back-end electronics, is well-known and will not be discussed here in detail. The thermal sensor device 100 may also be configured for use as a sensor for a non-contact digital thermometer.

The most commonly used materials for the thermal sensor element 106 are amorphous silicon and vanadium oxide ($VO_x$). Vanadium oxide occurs as a mixture of a plurality of different oxides of vanadium. For thermal sensor applications, x is commonly about 1.8. These materials are provided by way of example and should not be construed as limitations on the appended claims. There are many other materials that have been used for thermal sensor applications and all are considered to be within the scope of the embodiments herein. The example materials have resistances that vary with temperature with a temperature coefficient of resistance (TCR) that is suitable for thermal sensor applications.

The conduction of the electrical signal through each conductive path 108 of enhanced thermal resistance is at least in part due to the transport of conduction electrons through the conductive path 108 of enhanced thermal resistance. The conduction electrons of the conductive path 108 of enhanced thermal resistance have a mean free path that has a size scale. The phonon transport disrupting structure of the conductive path 108 may be on a size scale that is larger than the size scale of the mean free path of the conduction electrons in the conductive path 108 of enhanced thermal resistance so as to reduce any deleterious effect of the phonon transport disrupting structure on the conduction of the electrical signal through the conductive path 108 of enhanced thermal resistance.

The heat transfer through the conductive path 108 is at least in part due to the transport of phonons through the conductive path 108. The phonons of the conductive path 108 have a mean free path that has a size scale. The phonon transport disrupting structure of the conductive path 108 may be on the size scale of the mean free path of the phonons in the conductive path 108 so as to increase scattering and transport disruption of the phonons through the conductive path 108 and thus enhance the thermal resistance of the conductive path 108.

In some embodiments herein, the conductive path 108 that has enhanced thermal resistance includes a phonon transport disrupting structure comprising an electrically conductive alloy material or intermetallic material comprised of at least two or more elements to increase the thermal resistance of the conductive path 108 as compared to a similar conductive path that lacks the phonon transport disrupting structure. For instance, electrically conductive alloy material or intermetallic material forming the conductive path 108 may have an electrical conductivity ($\sigma$) no less than about $1.9 \times 10^5$ S/m and a thermal conductivity ($\kappa$) no more than about 22 $Wm^{-1}K^{-1}$ as exemplary thresholds.

Figure 1D:
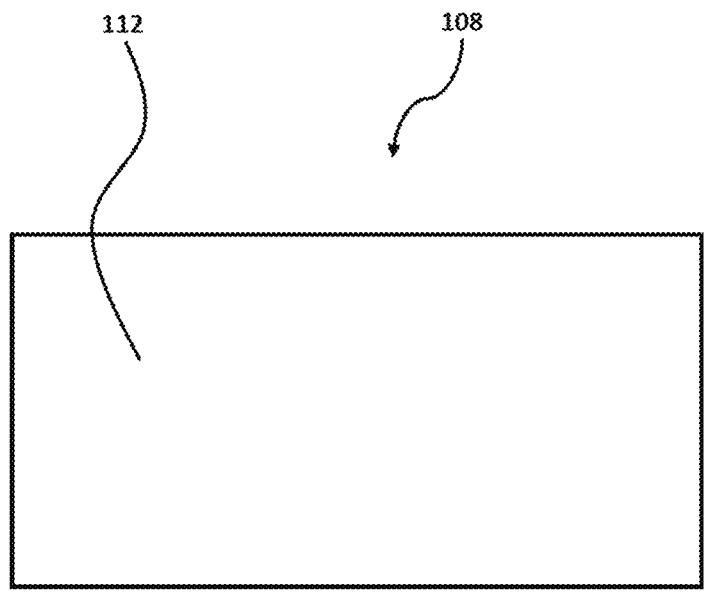

As shown in FIG. 1D, showing a side view of the conductive paths 108, they are preferable each formed of a homogeneous material layer. That is, they may be provided or depositing as a single layer, such as a film 112 or a bulk trace, providing the interconnecting. The electrically conductive alloy materials and intermetallic materials of the film 12 forming the conductive path 108 may be deposited in the device form by several thin film deposition methods including (but not limited to): physical vapor deposition (e.g., sputtering), chemical vapor deposition, evaporation, epitaxial growth, pulsed laser deposition, selective laser melting/sintering, and arc melt spinning. The traces for the interconnects would then be patterned and etched or milled to form the final geometry used in the device.

We note that the form of the alloy material (e.g., film or wire) results in a small difference in their values, with film having a slightly greater electricidal resistivity and thus slightly small electrical conductivity. The form may also affect the thermal conductivity. Likewise, the manufacturing processes may also affect one or both of those values. Thus, one might consider taking into their effects too.

Compared with other known strategies for achieving our goal, embodiments of the present invention have the advantages that the material forms ohmic contacts, is readily integratable into semiconductor fabrication processes, does not induce charge trapping, and may reduce thermal conductivity, while maintaining acceptable electrical continuity in the system. More particularly, there are further advantages over the methodologies disclosed in the '211 parent application; they include removal of complex multi-layered device fabrications, lowering/eliminating subsequent electronic noise from multi-layered and semiconducting materials, and improved electron mobility.

Embodiments herein may or may not use the alloy and intermetallic materials in an unquenched state. Those in an unquenched state, however, may not have a coherent grain boundary as was discussed in the '211 parent application as an additional phonon disruptor means. As such, there may be additional benefit of using the alloy and intermetallic materials in a quenched state in certain embodiments.

Figure 1E:
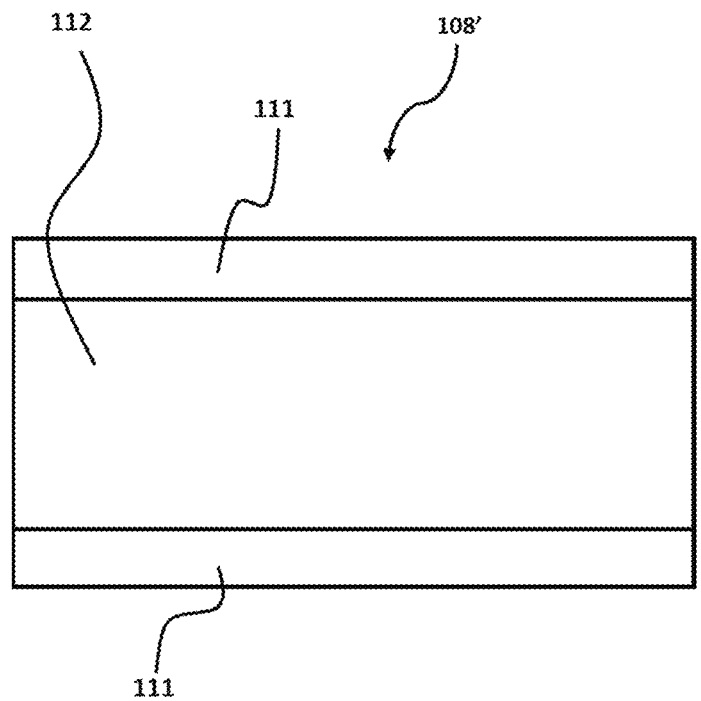

FIG. 1E shows an alternative embodiment of a conductive path 108' to the one in FIG. 1D. It is side view of the conductive path 108' (as though you are looking down the cross-section of the interconnect). Here, in this embodiment, the ordered intermetallic and lesser-ordered alloy materials are provided with a cladding 111. Exemplary materials for cladding 111 may include various oxides, such as aluminum oxide ($Al_2O_3$), hafnium oxide ($HfO_2$), or silicon oxide ($SiO_2$) to name a few. Oxide materials typically have a thermal conductivity of approximately 0.1-0.5 $Wm^{-1}K^{-1}$, which is very low, as well as very poor electrical conductivity. Thus, while they are not suitable for use as electrical conductors, they can provide increased thermal resistance, especially, at the external surface of the conductive path of enhanced thermal resistance. The cladding 111 may be provided on the top and/or bottom surfaces of the conductive path 108 since they have the greater surface area; but the cladding 111 could be applied around the entire periphery of the conductive path 108 for maximum coverage. Thus, in some embodiments herein, the conductive path 108 is covered by one or more cladding layers 111. The cladding 111 may be applied to the film 112 by similar deposition techniques as used for depositing the film 112. The thickness of the cladding 111 may be in the range of 5 nm to 25 nm each on the top and/or bottom surface of the film 112, for this purpose, as a non-limiting example.

By reducing the thermal conductivity of the film 112 by using ordered intermetallic and lesser-ordered alloy materials this may allow for the cladding 111 to no longer be necessary to make robust conductive interconnects. Yet, the cladding 111 may provide additional benefits, and provided for in some embodiments. For instance, the cladding 11 may be used to provide additional mechanical rigidity to the conductive path. When we use very thin films 112 to boost thermal resistance, the materials tend to become very compliant, much more so than in bulk materials. Therefore, giving it a more rigid cladding material 111 enhances mechanical robustness. The cladding 111 may be provided on the top and/or bottom surfaces of the conductive path 108' as shown in the figure for this purpose; but the cladding 111 could be applied around the entire cross-section (periphery) of the conductive path 108' for the reasons discuss above. The thickness of the cladding 111 may be in the range of 10 nm to 50 nm on the top and bottom surface of the film 112 for this purpose, as a non-limiting example.

In some further embodiments herein, the phonon transport disrupting structures based on the material selection for the conductive path 108 of enhanced thermal resistance may be used in conjunction with and in combination with one or more of the phonon transport disrupting structures discussed in the '211 parent application.

Alloy Scattering:
General Principles: Alloy Scattering in Intermetallic and Alloy Materials The general principle relies on the concept of "alloy scattering." This involves disrupting the ordinary path for phonons in a conductive path. We provide for scattering of phonons by using electrically conductive alloy materials or intermetallic materials in various embodiments. As discussed below, we use binary, ternary, quaternary and above alloy and intermetallic material compositions with acceptable thermal and electrical conductivity.

We define "intermetallic material" herein (which may also be referred to as an intermetallic compound, intermetallic alloy, ordered intermetallic alloy, and a long-range-ordered alloy) as multi-element metallic alloy that forms an ordered solid-state compound between at least two elements, typically including at least some metal elements. Generally, intermetallics are characterized as having long-range periodic order. Herein, we define "long-range" as more than 100 atomic lattice unit cells, and "periodic order" as the ability to predict from a unit cell the position of an atom in a unit cell an arbitrary number of unit cells away. These materials have a regular crystal packing (lattice) structure, such as B1, B2, B3, B4, B10, B17, B19 or B20.

We believe B2 crystal packing structures to be particularly advantageous because: 1) they are already typically pretty low thermal conductivity and 2) they are the easiest to manipulate the phonon spectrum. Other lattices can still be used for this purpose; there is nothing special about B2 in as far as the equations present herein being used. It is just the structure that provides the most pronounced effect. The B2 crystal packing structure it is an ordered Body Centered Cubic Structure (BCC) consisting of two simple cubic interpenetrating sublattices, and stoichiometrically, it can be represented by a theoretical 50:50 atomic distribution. This represents a highly ordered structure.

We define "alloy" herein as a multi-element material, typically including at least some metal elements, but having lesser order than an intermetallic material. The alloy materials may have a random, incomplete, or impartial lattice structure and thus lack much of an ordered lattice compared to the intermetallic materials. Generally speaking, they have no predictable long-range periodic order. We note that the term "alloy" is used broadly used in the metallurgy arts to describe any metallic compound with more than one element. This disclosure specifically refers to "alloy" in the sense of a more randomly distributed or disordered mixture of two or more elements, distinguishing it from "intermetallics" which according to our definition invokes long-range periodic order.

In terms of vibrational and electronic scattering mechanisms, these two concepts compete for dominance in the obtained value of thermal conductivity: periodic order typically allows both atomic vibrations (phonons) and electrons to more freely flow, while alloy scattering has the opposite effect.

The electrically conductive alloy materials and intermetallic materials we disclose and/or describe are comprised of at least two or more elements. In keeping with commonly used nomenclature, we use the terms "binary" to mean two elemental components, "ternary" to mean three elemental components, "quaternary" to mean four elemental components, "quinary" to mean five elemental components. (Note: should six or more metal components be used, one skilled in the art is more than capable of looking up those names). We first present binary materials and then discuss ternary and quaternary (or above) materials.

Binary Materials

Figure 2A:
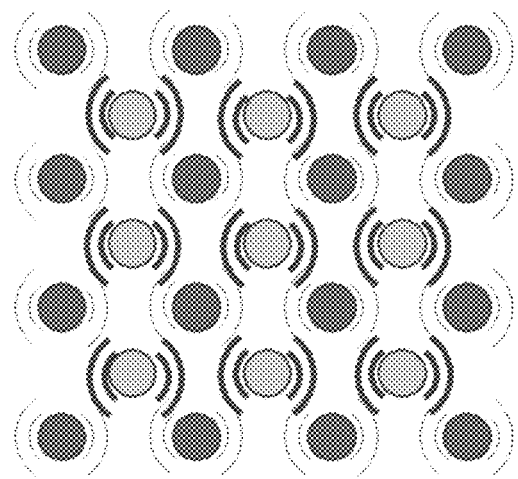
FIGS. 2A and 2B are atomic-scale schematics depicting the differences between ordered binary intermetallic and lesser ordered alloy systems in terms of vibration dynamics.
Figure 2B:
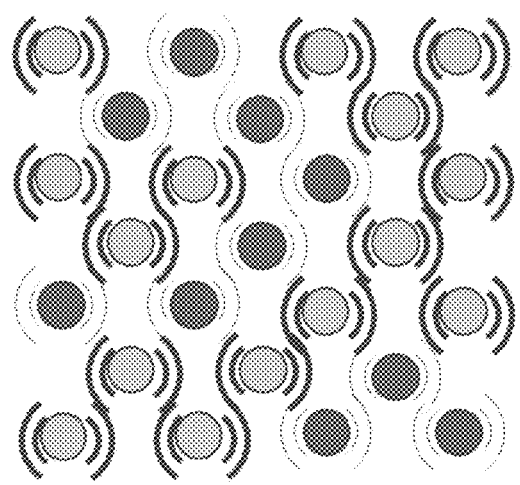
Figure 3A:
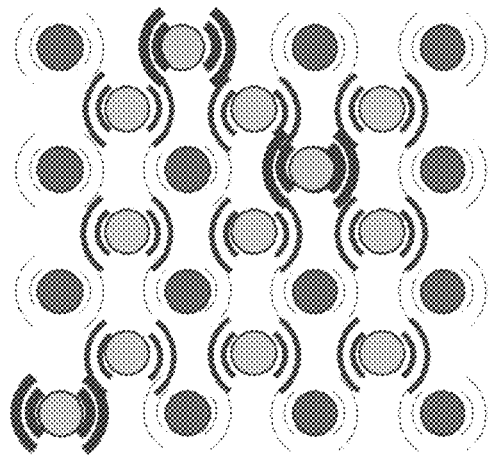
FIGS. 3A-3D are atomic-scale schematics depicting ordered (i.e., ternary and quaternary) intermetallic and lesser-ordered alloy systems in terms of vibration dynamics.
Figure 3B:
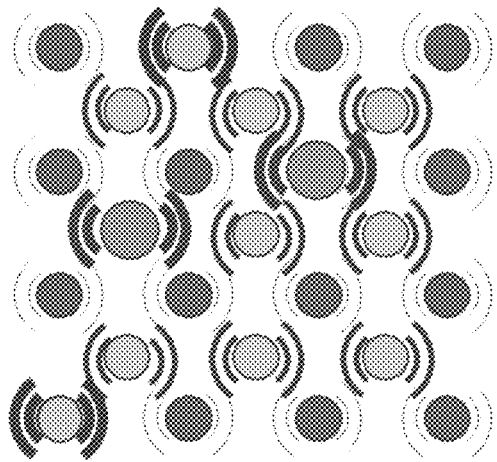
Figure 3C:
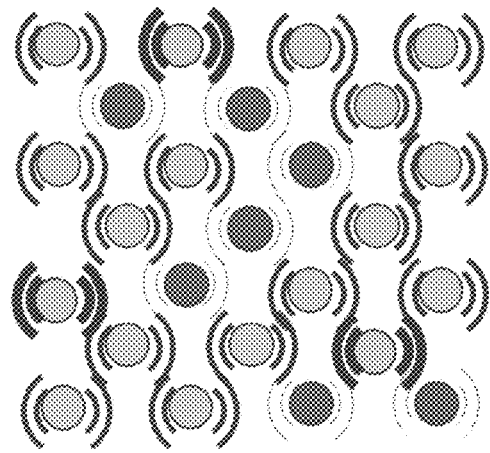
Figure 3D:
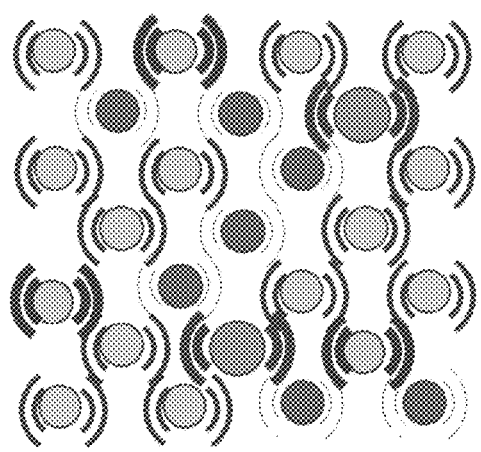

FIGS. 2A and 2B are atomic-scale schematics depicting the differences between ordered binary intermetallic and lesser ordered alloy systems in terms of vibration dynamics. These figures contrast the vibrational and electronic scattering mechanisms in an intermetallic material and an alloy material. FIG. 2A shows a side profile view illustration of an exemplary B2 intermetallic material. The lighter and darker shaded circles represent atoms of different elements, typically metals. They are at different planar locations in a representative BCC structure viewed from the side. FIG. 2B shows a side profile view illustration of an exemplary alloy structure. In terms of vibration dynamics, the more ordered intermetallic material systems will more readily transfer both electrons and phonons to neighboring atoms. On the other hand, the lesser-ordered alloy material includes greater dislocations, irregularity, imperfections, and/or randomness compared to the intermetallic material. This results, in general, in increase thermal resistance (or decreased thermal conductivity). But both material systems may be advantageous used in embodiments we contemplate.

We envision using only metal atoms in the conductive paths of enhanced thermal resistance having a thermal resistance in preferred embodiments, particularly multiple elements of the transition metal family. However, we anticipate and contemplate other embodiments involving non-metal elements commonly used in metallurgical applications such as: carbon (C), nitrogen (N), silicon (Si), sulfur (S), phosphorous (P), and oxygen (O) to name a few. Indeed, some nitrides also alloy with metals to make electrically conductive materials. As a general rule, we believe the equations and/or parameters discussed herein should work for the inclusion of non-metal elements in intermetallic materials and alloy materials. We believe they hold so long as the base (metal) elements are much heavier atoms than the non-metallic elements (like carbon or nitrogen), and as long as the incorporation of non-metallic elements (e.g., C or N) does not substantially compromise the electrical conductivity. The latter caveat can easily be confirmed with data in the open literature and/or empirical testing. The phonon disrupting properties of the elements listed will follow the same Klemens analytical model as they would with metals.

Ternary and Quaternary Materials

FIGS. 3A-3D are atomic-scale schematics depicting the differences between ordered higher-ordered (i.e., ternary and quaternary) intermetallic and lesser-ordered alloy systems in terms of vibration dynamics. The different shaded circles represent atoms of different elements, typically metals. They are at different planar locations in a representative BCC structure.

Compared with binary systems, ordered intermetallics and lesser-ordered alloys with three or more elements allow for additional reduction in thermal conductivity without a corresponding reduction in electrical conductivity. We call these "Ternary+" embodiments. This effect is due to greater anharmonic scattering at crystal lattice sites where heavy atoms substitute for another species and drastically change vibrational dynamics, while still providing the necessary electronic order to allow for acceptable electron transport.

Material Selection

Quantitatively, our aim is to find and use materials that will perform better than the current state of the art material (such as titanium), thereby improving thermal sensor sensitivity. Specifically, we aim for materials with as low of thermal conductivity ($\kappa$) as possible, but with high electrical conductivity ($\sigma$). The terms resistance and conductivity are both used herein. Those skilled in the art understand that they are reciprocals of one other. For instance, electrical conductivity is the inverse of electrical resistivity. Therefore, SI units of S/m units for electrical conductivity are equivalent to SI units of $1/(\Omega \cdot m)$ for electrical resistivity.

We initially used titanium (Ti) metal at a temperature of 300K as a reference point which has a thermal conductivity ($\kappa$) of about 22 $Wm^{-1}K^{-1}$ and an electrical conductivity ($\sigma$) of about $1.9 \times 10^6$ S/m.

For conductive paths of enhanced thermal resistance, according to some embodiments disclosed herein, we used a thermal conductivity threshold being less than that of titanium and the electrical conductivity threshold being greater than about 10% of titanium. In other words, we seek materials for conductive paths of enhance thermal resistance having an electrical conductivity ($\sigma$) no less than about $1.9 \times 10^5$ S/m and a thermal conductivity ($\kappa$) no more than about 22 $Wm^{-1}K^{-1}$. The lower the value of thermal conductivity the better the performance of the thermal sensor; so lower maximum thresholds may additionally be considered in other embodiments-especially those with thermal conductivity less than 8 $Wm^{-1}K^{-1}$ while maintaining electrical conductivity above $1.9 \times 10^5$ S/m. In applications where higher electrical conductivity is needed, the maximum thermal conductivity threshold may be higher, for example, for electrical conductivity over $1 \times 10^6$ S/m, maximum thermal conductivity should be less than 15 $Wm^{-1}K^{-1}$.

To these ends, we select electrically conductive alloy material, intermetallic material comprised of at least two or more metals, or some combination thereof to form the conductive paths. Specifically, we initially aimed for materials with as low of thermal conductivity as possible, with a threshold of it being less than that of titanium (i.e., $\kappa$<22 $Wm^{-1}K^{-1}$ at 300 K), while not reducing electrical conductivity to less than 10% of titanium (i.e., $\sigma$>$1.9 \times 10^5$ S/m at 300 K). Although, as we noted above, other thresholds may be used in other embodiments.

We identified the following materials systems exhibiting alloy scattering which may allow for minimization of phonon-mediated heat transport while still allowing acceptable electrical transport which may be used for embodiments herein. They include, but are not limited to:

TiN, NiTi, NiTiM (where M can include any (or all) of the following elements: Hf, Co, Fe, V, Cu, W, Pt, Pd), PbTe, PbSbTe, $VO_x$, $IrO_x$, $TiO_x$, HfN, strain glass alloys (FeNiMnC, TiPdCr, TiAu, TiPt, TiNiFe), and high entropy alloys (CoCrFeMnNi, AlCoCrCuFeNi, NbTaMoW, AlTiCoNiFe).

A key foundational concept that is leveraged in embodiments of the present invention herein is the optimization of the composition and processing conditions to obtain microstructure that allows for maximized phonon disruption without deleterious effects to the electron transport behavior (i.e., electrical conductivity). The "M" in the NiTiM structures can either be three or four (or more) elements, and the optimization tradespace between unique compositions and processing conditions leads to thermal conductivity as low as 2 $Wm^{-1}K^{-1}$ in bulk materials (which would manifest as thermal conductivity of approximately 0.5 $Wm^{-1}K^{-1}$ in thin films at relevant thicknesses assuming the same heat carrier mean free path as elemental titanium (Ti). Machine learning models optimized for relating composition with minimized thermal conductivity, minimized heat capacity, and maximized electrical conductivity may be employed to achieve even better materials than those already obtained. The limiting physics is explored next.

In the extreme case where heat is carried solely by electrons and phonon transport does not play an appreciable role, bulk NiTiM materials can have thermal conductivity less than 1.4 $Wm^{-1}K^{-1}$, and still maintain an acceptable electrical conductivity of $1.9 \times 10^5$ S/m. NiTiM materials have lower thermal conductivity than any of their elemental and alloy counterparts due to greater anharmonic scattering within the crystal structure and due to boundary scattering at grain boundaries.

Moreover, we have identified intermetallic compounds with the correct crystal orientation and alloy with appropriate substitutional species. These include, but are not limited to:

NiTiX and NiTiXY where X and Y can include any (or all) of the following elements: Hf, Co, Cu, V, Al, Fe, Mn, Cr, W NiAlX and NiAlXY where X and Y may include any (or all) of the following elements: Hf, Zn, Ga, Co, Cu, V, Al, Fe, Mn, Cr, W CuZnX and CuZnXY where X and Y may include any (or all) of the following elements: Hf, Co, V, Al, Fe, Mn, Cr, W Tables 1-4, presented at the end of this disclosure, provide thermal conductivity and electrical conductivity values for various binary and ternary, quaternary and above (we refer to them as "Ternary+") intermetallic and randomly ordered alloy materials. These values given are for the material in a bulk, size-independent, state. They demonstrate a number of particular electrically conductive alloy materials or intermetallic materials comprised of at least two or more elements which have an electrical conductivity ($\sigma$) no less than about $1.9 \times 10^5$ S/m and a thermal conductivity ($\kappa$) no more than about 22 Wm$^{-1}$K$^{-1}$ in accordance with some embodiments.

Prediction Models and Modelling

Thermal and electrical conductive properties have been characterized for various materials in the open literature. One paper is Y. Terada, et al., "Thermal conductivity of intermetallic compounds with metallic bonding," Materials transactions, 43(12), 2002, pp. 3167-3176, herein incorporated by reference. In that paper, the authors demonstrate this concept using separate thermal and electrical conductivity measurements and relating them via the Wiedmann-Franz law: $\kappa/\sigma = L_0 T$, where $\kappa$ and $\sigma$ are the thermal and electrical conductivity, respectively, $L_0$ is the constant known as the Lorentz coefficient and T is the temperature at which the comparison occurs.

They showed that at certain binary alloy concentrations, preferred order emerges which boosts both thermal and electrical conductivity, while the Wiedemann-Franz law tends to accurately predict thermal conductivity strictly from the electronic contribution. For instance, FIG. 8 of their paper is a plot showing data demonstrating that in B2 intermetallic and alloy systems, thermal conductivity increases near points where crystal order preferentially forms, whereas in disordered states, disorder causes sharp reduction in thermal conductivity. We exploit this discovery to provide materials having low thermal conductivity, but still maintaining high electrical conductivity, and refer to it as "alloy scattering." They did not. For instance, their FIG. 5 is a plot of electrical conductivity vs. thermal conductivity, showing that for many binary metallic materials systems, thermal conductivity is dominated by the electronic contribution (as is apparent, the is a linear relationship between electrical conductivity and thermal conductivity for the materials shown on that plot based on the Wiedemann-Franz law). Thus, selecting a material with high electrical conductivity likely also results in high thermal conductivity. And conversely, selecting a material with a low thermal conductivity likely results in low electrical conductivity. Neither is a good solution for our goals.

Their technique typically enhances thermal resistance at the expense of decreasing the electrical conductivity of the material. Thus, it is effectively a tradeoff. For instance, a reduction in electrical conductivity is offset by the signal quality gained from enhanced thermal resistance may be nearly a 1:1 ratio or worse.

We further note that B2 structures, such as in the cases of CoAl and FeTi depicted in their FIG. 5 plot, tend to produce thermal conductivities slightly higher than the Wiedemann-Franz law prediction, and this tends to be more pronounced at lower values of electrical and thermal conductivity, where the principles presented here are concerned. In such scenarios, thermal conductivity from Wiedemann-Franz law may under-predict observed thermal conductivity by up to 50%. Thus, we have also determined that the Wiedemann-Franz law may not be a good predictor for our goals.

It is important to note that alloy scattering alone in metallic systems may not always provide a significant advantage to reducing thermal conductivity. Nonetheless, it provides a good starting methodology.

Thus, we further present methodologies which better predict materials for embodiments which do not sacrifice electrical conductivity for gains in thermal resistance in this manner. To this end, we seek to characterize and optimize both electrical conductivity and thermal conductivity in a way to meet our goals. This provides a strategy allowing for substantial reduction in thermal conductivity without reducing electrical conductivity allows for a much higher degree of tailorability in the final temperature sensor.

According to one particularly embodiment, we use the Klemens analytical model for predicting a thermal conductivity and the Nordheim rule for predicting electrical conductivity.

By judiciously designing the conductive path 108 using select alloy materials or intermetallic materials consisting of two of more metals/elements, it is possible to increase scattering and transport disruption of the phonons through the one conductive path of enhanced thermal resistance. This phenomenon may be described by the Klemens analytical model, reported in R. Gurunathan, et al., "Alloy scattering of phonons," Materials Horizons, 7(6), 2020 pp. 1452-1456, herein incorporated by reference in its entirety, as follows:

$$\frac{k_L}{k_0} = \frac{\tan^{-1} u}{u}, \text{ where } u = \left( \frac{(6\pi^5 V^2)^{\frac{1}{3}}}{2 k_B v_s} k_0 \Gamma \right)^{1/2}, \quad (1)$$

$$\text{where } \Gamma = \frac{\langle \Delta M^2 \rangle}{\langle M^2 \rangle},$$

$\langle \Delta M^2 \rangle$ is the average mass variance, $\langle M^2 \rangle$ is the average mass squared, $k_0$ is the thermal conductivity of a pure material, $\kappa_L$ is the lattice thermal conductivity of the alloy, V is the volume of a unit cell of the compound, and $v_s$ is the average speed of sound in the material.

Therefore, materials that have largely different masses than their base compounds scatter more phonons. FIG. 2 in that paper shows the effect of reduced lattice thermal conductivity in the materials presented in that study. Note that in the absence of alloy scattering in these materials, the thermal conductivity would follow a rule of mixtures, which is depicted by the straight line from the left side to right side of the graph, labeled K0.

Figure 4:
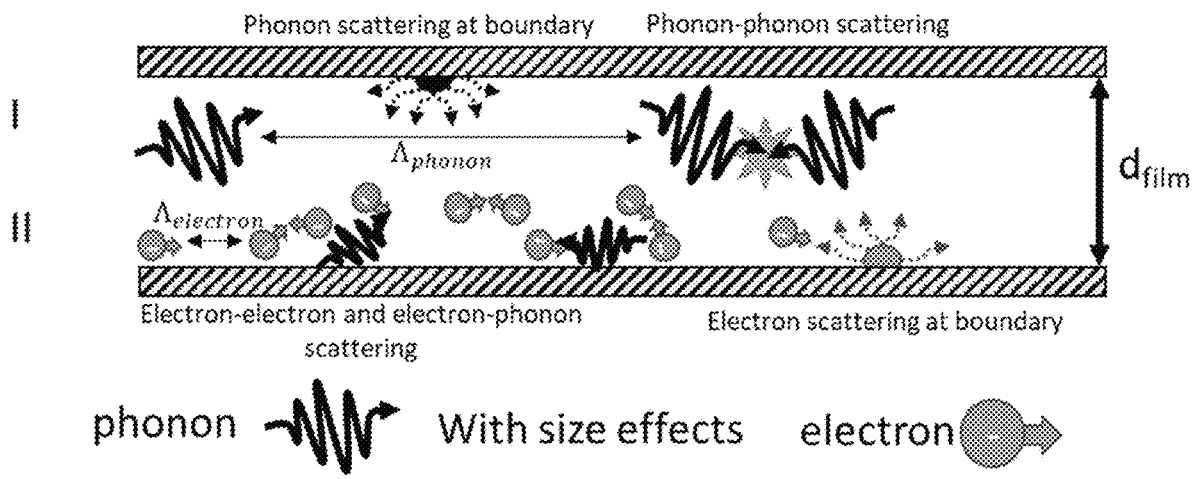
FIG. 4 is a schematic depicting scattering mechanisms experienced with thin films exhibiting size effects based on phonon mean free path and the electron mean free path.

Similarly, electrical conductivity of binary alloys may be projected by a combination of the Nordheim rule and rule of mixtures. The Nordheim rule is expressed by:

$$\sigma = \frac{1}{CX(1-X)},$$

where C is the Nordheim coefficient of one material in a "solution" of the other (which may be looked up from tables or measured experimentally), and X is the atomic fraction of the element being added to the solution. This rule allows for prediction of resistivity up to the solubility limit (which at the atomic scale is driven by changes in the electron density of states; the Nordheim rule assumes no such changes and that the matrix is homogenous and single phase). Some materials may be fully soluble with each other, and the assumptions in Nordheim's rule may remain valid. An example of this may be Cu—Ni alloys, such as those discussed by R. G. Delatorre et al., "Thermoelectric properties of electrodeposited CuNi alloys on Si," Journal of applied physics, 93(10), 2003, pp. 6154-6158, herein incorporated by reference in its entirety. Their FIG. 4 shows the validity of this relation with Cu—Ni alloys. Note that electrical conductivity there is found to be $\sim 2 \times 10^6$ S/m, while total thermal conductivity may be lower than 15 Wm$^{-1}$K$^{-1}$.

For material concentrations beyond the solubility limit, two phase solutions exist, whose resistivities are related by a rule of mixtures, which is expressed by $\sigma=\sigma_A X+\sigma_B (1-X)$, where $\sigma_A$ and $\sigma_B$ are the electrical conductivity of material A (the alloy at the minimum point beyond solubility of A in B) and material B (the alloy at the maximum point before solubility of B in A), respectively. To use these two relations, the Nordheim coefficient of the materials of interest must be known, and the conditions to use the Nordheim rule must be met (randomly oriented alloy, no long-range order, electron density of states must not change with composition). Beyond these conditions, first principles calculations may be employed if detailed information about the constituent elements are known such as the electron densities of states, the Fermi level of the materials, and the expected inter-band transitions that may contribute to electron scattering in alloys.

Combination of Alloy Scattering and Size Effects:

In further embodiment, we configure the size of the conductive path of enhanced thermal resistance 108 formed of an electrically conductive alloy material or intermetallic material comprised of at least two or more elements to further minimize thermal conductivity while not substantially reducing electrical conductivity. Thus, it is the combination of alloy scattering and size effects which we use to further tailor thermal and electrical transport in intermetallic and alloy material systems. For instance, we configure the thickness of the conductive path of enhanced thermal resistance to this end based on the mean free paths of electrons and phonons through the path. Sizing can be used for both alloy and intermetallic materials; it can be used for binary, ternary and quaternary (or above) materials too.

Herein, we use the term "mean free path" to refer to the average distance (Λ) over which a moving particle (more specifically herein, an electron or a phonon) travels before substantially changing its direction or energy), typically as a result of a collision or collisions with other particle(s) or the material boundary. More particularly, we set the material thickness to be greater than the electron mean free path, but less than the phonon mean free path. Typically, this corresponds to a mean free path range of about 10 nm to 30 nm for most materials we envision.

General Principle: Size Effects on Thermal and Electrical Transport

In addition to alloy scattering and anharmonic scattering in ordered intermetallic and lesser-ordered alloy materials, the size scales utilized in multi-element thin metal films also will dictate the extent to which thermal and electrical transport may be tailored. This is because as the dimensions of the material approach the mean free path between scattering events in a bulk material, scattering rates will increase and lead to decreased conductance (both thermally and electrically). In the envisioned applications, film thickness is less than 1% the characteristic sizes of the other dimensions; therefore, as a good approximation, the material may be treated as a semi-infinite thin film.

Generally, thermal transport conductance along a semi-infinite planar thin film of thickness d follows the following relation (known as the Fuchs-Sondheimer solution):

$$\frac{k_{film}}{k_{bulk}} = 1 - \frac{3\zeta_{phonon}(1-p)}{2}\int_0^1 (\mu-\mu^3)\frac{1-\exp\left(-\frac{\zeta_{phonon}}{\mu}\right)}{1-p\exp\left(-\frac{\zeta_{phonon}}{\mu}\right)}d\mu, \quad (2)$$

where $\kappa_{film}$ is the thermal conductivity of the thin film, $\kappa_{bulk}$ is the corresponding bulk thermal conductivity, p is the fraction of energy carriers specularly reflected at the interface, μ is a dummy variable of integration, and $\zeta_{phonon}=d_{film}/\Lambda_{phonon}$, where $\Lambda_{phonon}$ is the phonon mean free path (i.e. the average distance a phonon will travel before it collides with an electron or another phonon).

Similarly, the Fuchs-Sondheimer solution may be employed to project size effects on electron transport, replacing $\kappa_{film}$ and $\kappa_{bulk}$ with $\sigma_{film}$ and $\sigma_{bulk}$, respectively, and $\Lambda_{phonon}$ with $\Lambda_{electron}$. The form of the equation is otherwise identical.

$$\frac{\sigma_{film}}{\sigma_{bulk}} = 1 - \frac{3\zeta_{electron}(1-p)}{2}\int_0^1 (\mu-\mu^3)\frac{1-\exp\left(-\frac{\zeta_{electron}}{\mu}\right)}{1-p\exp\left(-\frac{\zeta_{electron}}{\mu}\right)}d\mu, \quad (3)$$

These two equations are adapted from G. Chen, Chapter 7: "Classical Size Effects" in Nanoscale energy transport and conversion: a parallel treatment of electrons, molecules, phonons, and photons. Oxford University Press. 2005. pp. 287-288, herein incorporated by reference.

The film thickness is just the physical dimension of the material. The mean free path is what can be different for phonons and electrons. In the case of the range of film thicknesses where the Fuchs-Sondheimer relation is valid, our traces and pathways are much larger in the length and width directions (e.g., on the order of is to 10 s micrometers, or at least 100× larger than the film thicknesses we're talking about for size effects). The determining factor as to the impact of size effects on the material in question is the mean free path of the material. To reduce thermal conductivity more than electrical conductivity, phonon mean free paths need to be greater than electron mean free paths to make use of size effects. In other words, $\Lambda_{phonon}>\Lambda_{electron}$. To solve this equation, numerical integration solvers, such as Matlab's trapz function, may be employed to obtain a quasi-analytical solution to the size-effects-driven reduction in conductivity.

We typically assume p to be zero, meaning energy reflecting at the boundaries is assumed to be diffusively scattered. But, with more accurate modeling, one could use determine and use non-zero values for this variable in these equations.

FIG. 4 is a schematic depicting scattering mechanisms experienced with thin films exhibiting size effects based on phonon mean free path and the electron mean free path. The figure schematically depicts the scattering mechanisms responsible for the apparent reduction in thermal and electrical conductivity due to size effects via the Fuchs-Sondhimer solution. There are multiple modes of scattering (as noted in that figure): phonon scattering at boundary; phonon-phonon scattering; electron-electron scattering; electron-phonon scattering; and electron scattering at boundary. Region I depicts transport when the thickness of the film is smaller than the mean free path (i.e. on average, the carrier will collide with the boundary before it collides with another carrier) and Region II depicts the opposite case, where the carrier on average has several collisions with other carriers prior to colliding with the boundary (where the film thickness is significantly larger than the mean free path of the carriers). As apparent, boundary scattering occurs for both phonons and electrons. The alloy/ordered intermetallic scattering introduces more opportunity for phonon-phonon scattering, electron-phonon scattering, and (even though we try to minimize it) electron-electron scattering.

In region I, the average distance between phonon collisions with other phonons or electrons is less than the thickness of the film, $d_{film}$. This leads to size effects effectively reducing thermal conductivity. On the other hand, in region II, the average distance between collisions is smaller than $d_{film}$. The relative impacts of these two scenarios will be discussed next.

In crystalline materials which typically may exhibit advantageous electrical properties, phonon mean free path values range from <1 nm-1 µm, while typically electron mean free path values range from 10 nm to 100 nm. This varies greatly from material to material; however, with judicious material selection, using known phonon and electron mean free path data, suitable material, that has suitable electrical conductivity while exhibiting an advantageous or sufficient difference between the mean free paths of phonons and electrons, can be identified. For many binary metallic systems, electron mean free paths are on the order of single-digit nanometers. For phonons in ordered systems, mean free path is on the order of 10 nm, while for alloyed systems, phonons tend to scatter much nearer the unit cell such that electron and phonon mean free paths are near equal. We have measured thermal and electrical conductivity of representative bulk three- and four element compounds, and assuming mean free path values of $\Lambda_{electron}=3$ nm and $\Lambda_{phonon}=30$ nm (which represent reasonable guesses for mean free path values as direct data on these systems is not readily available) we project the impact of size effects with mean free paths at these scales. To do this, we use equation 2 with $\Lambda_{phonon}=30$ nm and varying $d_{film}$ from 1 Å to 1 µm while taking the bulk value of thermal conductivity for NiTiHf and NiTiCoHf materials from Table 2. Then we repeat this across the same film thickness range to determine size effects on electron transport using equation 3 with $\Lambda_{electron}=3$ nm while taking the bulk value of electrical conductivity values for the materials from Table 2.

Figure 5A:
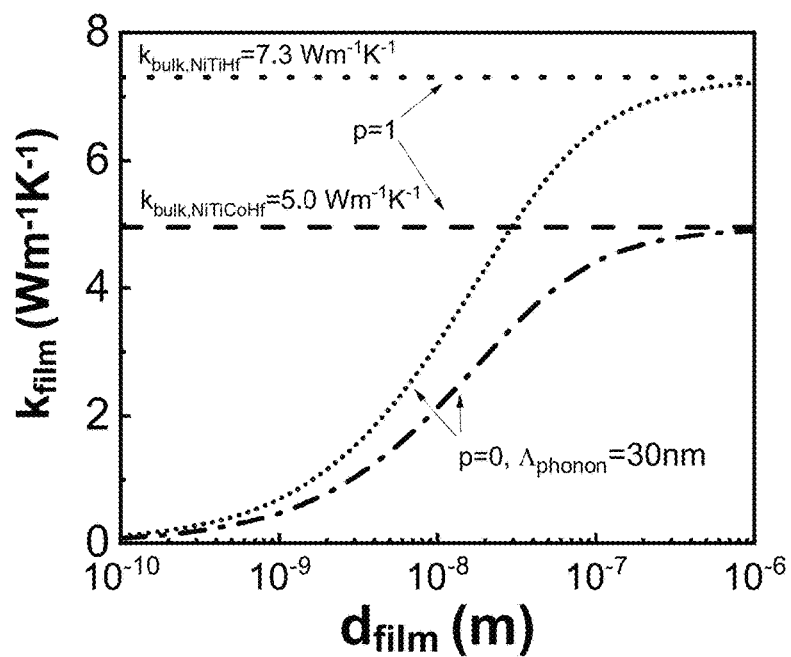
FIGS. 5A-5C are plots depicting mean free path data for phonons and electrons for two exemplary intermetallic materials: NiTiHf and NiTiCoHf.
Figure 5B:
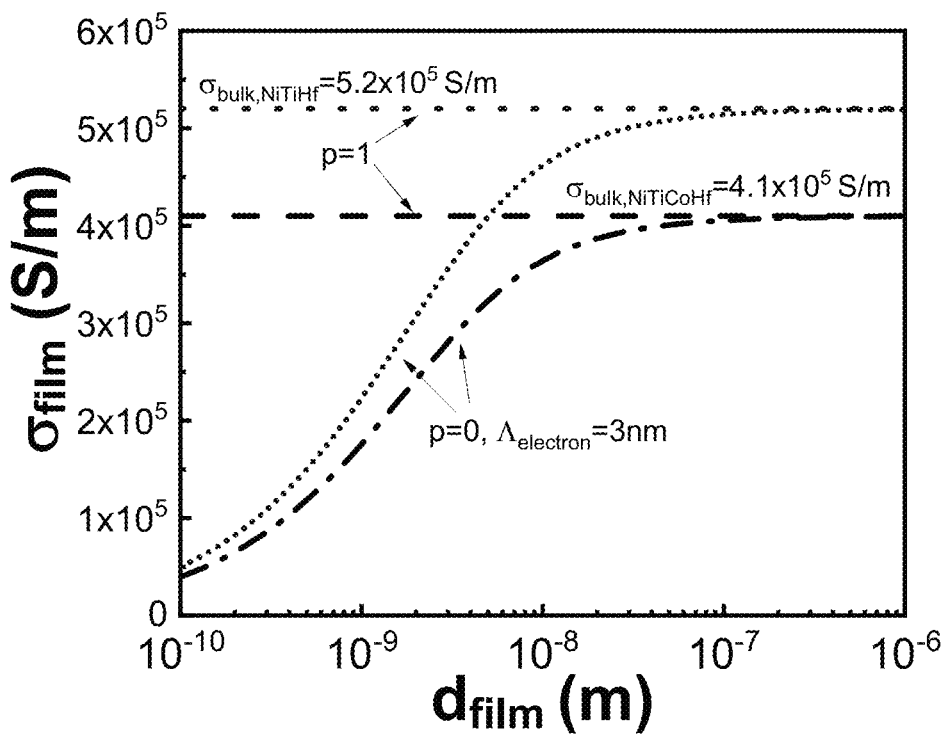
Figure 5C:
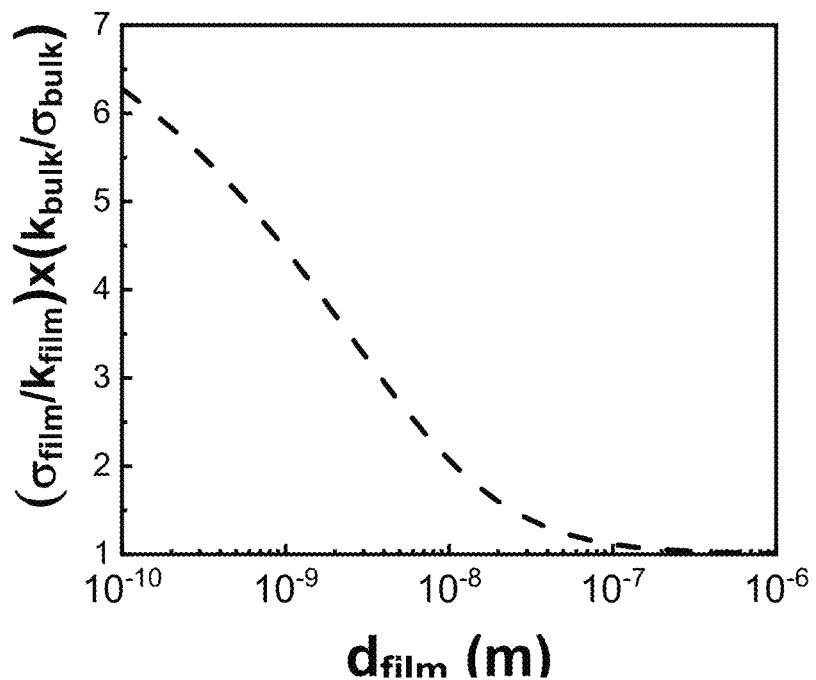

FIGS. 5A-5C are plots depicting mean free path data for phonons and electrons for two exemplary intermetallic materials: NiTiHf and NiTiCoHf. Here, we assume diffusive reflections at the interface (i.e., p=0). FIG. 5A shows projecting size effects (i.e., film thickness $d_{film}$) for these two materials assuming a phonon mean free path $\Lambda_{phonon}$ of 30 nm. FIG. 5B shows projecting size effects (i.e., film thickness $d_{film}$) for the material, assuming an electron mean free path $\Lambda_{electron}$ of 3 nm. The plotted values are expected to be comparable to the electron and phonon mean free path values, respectively, and compared against measured values of bulk thermal and electrical conductivity. It is evident that, if phonons have larger mean free path, thermal conductivity may be truncated well before electrical signal is also truncated at these scales, as evidenced by the reduction ratio reported as a function of film thickness shown in the plot of FIG. 5C, which shows film thickness $d_{film}$ vs. the following ratio:

$$\frac{\frac{k_{film}}{k_{bulk}}}{\frac{\sigma_{film}}{\sigma_{bulk}}} = \frac{k_{film}}{\sigma_{film}} \times \frac{\sigma_{bulk}}{k_{bulk}}. \quad (4)$$

As an example, a ratio value of 4 indicates that thermal conductivity is four times more reduced than electrical conductivity at the values of mean free path and film thickness considered.

Electron transport is likely to suffer some deleterious effects due to the size restrictions aimed at reducing thermal conductivity. In many systems, electrons can become trapped in a Schottky barrier. Therefore, selecting material pairs that maintain Ohmic contact between the sensor and the read-out integrated circuit will be critical to maintain device function. Good mobility of the active layer will also be critical to maintain acceptable 1/f noise. Materials selected for thermal sensor applications should exhibit these characteristics while also exhibiting a strong phononic contribution to thermal conductivity.

Thermal sensors rely on the absorption of thermal energy and subsequent translation to measurable signal. This is enhanced when the sensing element experiences a larger temperature change for a given amount of absorbed thermal energy. Standard practices to enhance performance have relied on material selection and design of geometry. In the embodiments disclosed herein, intentional introduction of phonon-scattering mechanisms allows for the enhancement of thermal resistance without sacrificing electrical performance. This is achieved by selecting the scattering mechanism to be comparable with the phonon mean free path, but larger than the electron mean free path in the material. Reduction in thermal conductance allows for increase in temperature rise, which increases sensitivity of the sensor. By disrupting phonon heat transfer, the thermal resistance in thermal sensors may experience significant enhancement, leading to higher performance; improved size, weight, power consumption, and cost; and faster speeds.

Testing and Analysis

In Tables 1-4, we present a few exemplary materials for embodiments of the present invention. But these are not exhaustive by any means. We believe may more alloy and intermetallic materials exist, discovered, or made, which also may be used for other embodiments. The open literature may be a good starting point for determining thermal conductivity (κ) and electrical conductivity (σ) values for candidate materials. Additionally, candidate alloy and intermetallic materials used in embodiments may be modelled, predicted and/or empirically tested. Modelling may be done using first principles (i.e., applying the time-dependent Schrodigner equation with appropriate conditions), and predictive models may be developed using a combination of machine learning and molecular dynamics. Empirical testing of thermal and electrical conductivity may be done using well established procedures for bulk materials, such as ASTM standards for thermal conductivity and for electrical conductivity. For example, for measuring thermal conductivity, the following standards may be used: ASTM C518-21 "Standard Test Method for Steady-State Thermal Transmission Properties by Means of the Heat Flow Meter Apparatus" or ASTM E1461-13(2022) "Standard Test Method for Thermal Diffusivity by the Flash Method" and ASTM E1269-11(2018) "Standard Test Method for Determining Specific Heat Capacity by Differential Scanning Calorimetry" We note that thermal conductivity is the product of thermal diffusivity and specific heat capacity; hence why there standards are used together.

For measuring electrical conductivity: the following standards may be used ASTM E1004-17 "Standard Test Method for Determining Electrical Conductivity Using the Electromagnetic (Eddy Current) Method" or "ASTM F76-08(2016) e1 "Standard Test Methods for Measuring Resistivity and Hall Coefficient and Determining Hall Mobility in Single- Crystal Semiconductors" (we note this one just determines the resistivity part, but one can take the inverse to get conductivity values).

For thin films, no ASTM standard are believed to exist, but thermoreflectance methodologies (such as those reported in D. G. Cahill, "Analysis of heat flow in layered structures for time-domain thermoreflectance," Review of scientific instruments, 75(12), 2004, pp. 5119-5122, herein incorporated by reference) may be used to assess thermal properties of semi-infinite films, and for arbitrary confined geometries Warzoha, R. J., Wilson, A. A., Donovan, B. F., Smith, A. N., Vu, N., Perry, T., Li, L., Miljkovic, N. and Getto, E., "A numerical fitting routine for frequency-domain thermoreflectance measurements of nanoscale material systems having arbitrary geometries," Journal of Applied Physics, 129(3), 2021, p. 035103, herein incorporated by reference.

Manufacturing Methods

Figure 6:
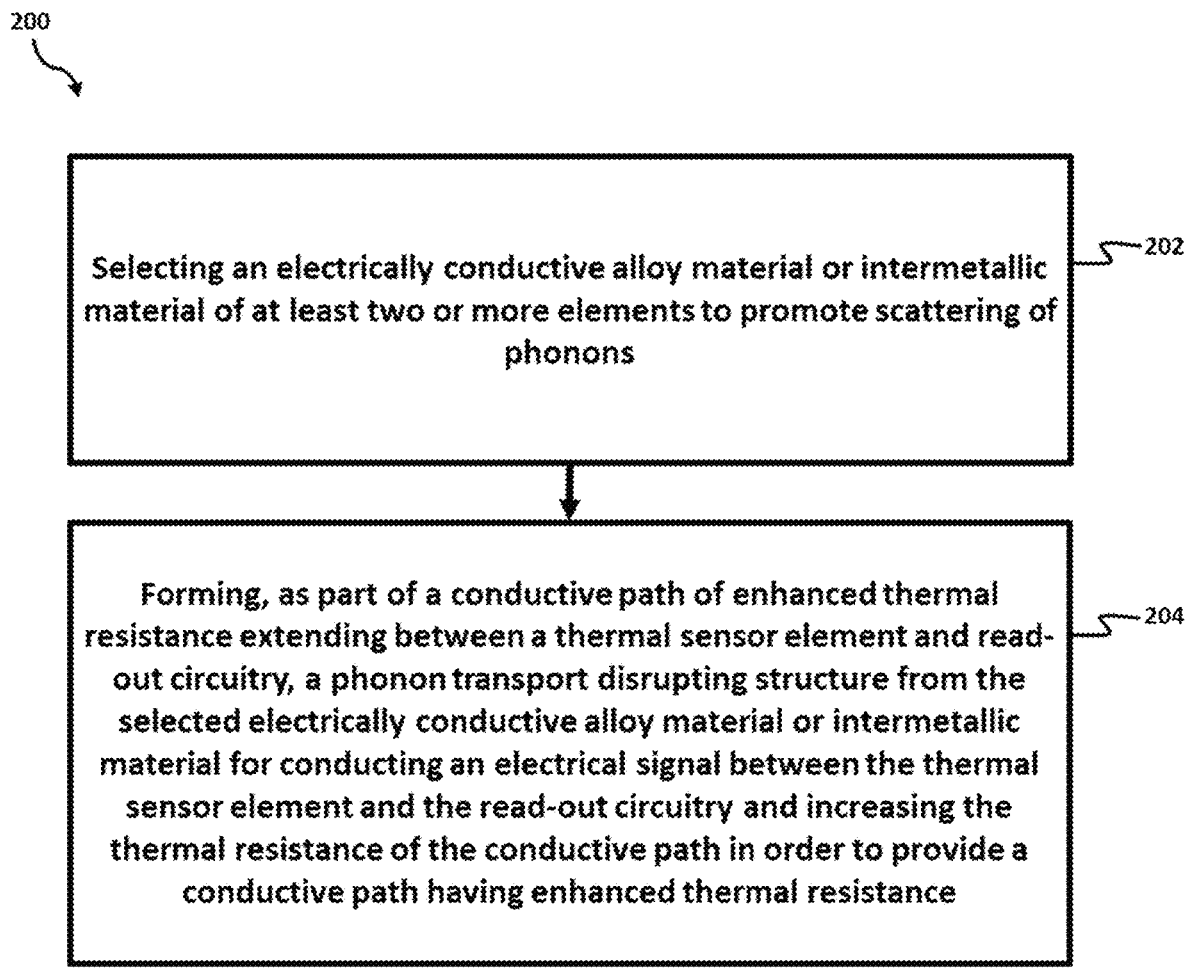
FIG. 6 is a flow diagram illustrating an exemplary process for forming a conductive path of enhanced thermal resistance having a phonon transport disrupting structure in an electronic device according to some embodiments herein.

FIG. 6 is a flow diagram illustrating an exemplary process 200 for forming a conductive path of enhanced thermal resistance having a phonon transport disrupting structure in an electronic device according to embodiments herein.

The method (200) includes selecting (202) an electrically conductive alloy material or intermetallic material of at least two or more elements to promote scattering of phonons. In some embodiments herein, the electrically conductive alloy material or intermetallic material is selected to have a thermal conductivity ($\kappa$) no more than about 22 Wm$^{-1}$K$^{-1}$ and an electrical conductivity ($\sigma$) no less than about $1.9 \times 10^5$ S/m. Although, other thresholds may be used one or both of $\kappa$ and a as discussed above.

The method (200) also includes forming (204), as part of the conductive path 108, forming (204), as part of a conductive path of enhanced thermal resistance extending between a thermal sensor element and read-out circuitry, a phonon transport disrupting structure from the selected electrically conductive alloy material or intermetallic material for conducting an electrical signal between the thermal sensor element and the read-out circuitry and increasing the thermal resistance of the conductive path 108 in order to provide a conductive path 108 having enhanced thermal resistance. The conductive path of enhanced thermal resistance may be a film formed, for instance, by: physical vapor deposition; chemical vapor deposition, evaporation, epitaxial growth, pulsed laser deposition, selective laser melting/sintering, or arc melt spinning. Or the conductive path of enhanced thermal resistance may be a conductive trace which is patterned and etched or milled. Such techniques are known.

The conductive path 108 has enhanced thermal resistance compared to a similar conductive path that would be made of the material, that would be configured for conducting electrical signals between the thermal sensor element 106 and the read-out circuitry 104, that would be identical in geometry to the conductive path 108 of enhanced thermal resistance but would lack the phonon transport disrupting structures of the conductive path 108 of enhanced thermal resistance.

In some embodiment herein, forming (204) the phonon transport disrupting structure comprises forming a homogenous layer or film of an electrically conductive alloy or intermetallic material, wherein the thickness of each of the layers is selected so as to cause scattering of phonons while not significantly inhibiting the transport of conduction electrons through the conductive path 108 of enhanced thermal resistance. In some embodiments herein, forming (204) the phonon transport disrupting structures comprises forming a single homogenous layer.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the appended claims.

TABLE 1

Binary Intermetallics

| Material | Thermal Conductivity (Wm$^{-1}$K$^{-1}$) @ 300 K | Electrical conductivity (S/m) @300 K |
|---|---|---|
| Ni$_x$Ti$_{1-x}$ $_{0.45<x<0.55}$ | 10-20 [A] | 1.1-1.4 × 10$^6$ [B] |
| Co$_x$Ga$_{1-x}$ $_{x=0.5}$ | 10 [E] | 1.4 × 10$^6$ [E] |
| Al$_x$Fe$_{1-x}$ $_{x=0.5}$ | 12 [E] | 1.7 × 10$^6$ [E] |

TABLE 2

Ternary + Intermetallics

| Material | Thermal Conductivity (Wm$^{-1}$K$^{-1}$) @ 300 K | Electrical conductivity (S/m) @300 K |
|---|---|---|
| NiTiHf | 7.3 [C] | 5.2 × 10$^5$ [D] |
| NiTiCoHf | 5.7 [D] | 4.1 × 10$^5$ [D] |
| hcp-GeSbTe | 1.3 [G] | 2.5 × 10$^5$ [F] |

TABLE 3

Binary Lesser Ordered Alloys

| Material | Thermal Conductivity (Wm$^{-1}$K$^{-1}$) @ 300 K | Electrical conductivity (S/m) @300 K |
|---|---|---|
| a-NiTi | 1.4 [H] | 2.5 × 10$^5$ [I] |
| CuNi | 14.8 [J] | 2.1 × 10$^6$ [J] |
| TiN | 19.0 [K] | 4 × 10$^6$ [K] |

TABLE 4

Ternary + Lesser Ordered Alloys

| Material | Thermal Conductivity (Wm$^{-1}$K$^{-1}$) @ 300 K | Electrical conductivity (S/m) @300 K |
|---|---|---|
| Fe$_{0.55}$Ni$_{0.2}$Cr$_{0.25}$ | 14.2 [L] | 1.3 × 10$^6$ [L] |
| Zr$_{0.55}$Al$_{0.1}$Ni$_{0.05}$Cu$_{0.3}$ | 5.0 [M] | 1.9 × 10$^6$ [M] |
| Pd$_{0.4}$Ni$_{0.4}$P$_{0.2}$ | 7.0 [N] | 1.2 × 10$^6$ [N] |

REFERENCES IN ABOVE TABLES

A) Warzoha, R. J., Vu, N. T., Donovan, B. F., Cimpoiasu, E., Sharar, D. J., Leff, A. C., Wilson, A. A. and Smith, A. N., "Grain growth-induced thermal property enhancement of NiTi shape memory alloys for elastocaloric refrigeration and thermal energy storage systems," *International Journal of Heat and Mass Transfer*, 154, 2020. p. 119760.

B) H. Matsumoto, "Irreversibility in transformation behavior of equiatomic nickel-titanium alloy by electrical resistivity measurement," *Journal of alloys and compounds*, 368(1-2), 2004, pp. 182-186.

C) Hite, N., Sharar, D J., Trehern, W., Umale, T., Atli, K C., Wilson, A. A., Leff, A. C. and Karaman, I, "NiTiHf shape memory alloys as phase change thermal storage materials," *Acta Materialia*, 218, 2021, p. 17175.

D) Data collected at ARL, which was previously unpublished.

E) Y. Terada, et al., "Thermal conductivity of intermetallic compounds with metallic bonding. Materials transactions," 43(12), 2002. pp. 3167-3176.

F) P. Guo, et al., "A review of gennanium-antimony-teliuride phase change materials for non-volatile memories and optical modulators," *Applied sciences*, 9(3), 2019, p. 530.

G) E. A. Scott, et al., "Thermal conductivity of (Ge2Sb2Te5) 1-x C x phase change films," *Journal of Applied Physics*, 128(15), 2020, p. 155106.

H) X. Wang, et al. "Thermal modeling of laser-annealing-induced c tystallization of amorphous NiTi thin films," *Applied Physics A*, 90(4) 2008, pp, 689-694, I) X. Huang, et al, "A morphous nickel titanium alloy film: a new choice for cryo electron microscopy sample preparation," *Progress in biophysics and molecular biology*, 156, 2020, pp. 3-13.

J) R. G. Delatorre, et al., "Thermoelectric properties of electrodeposited CuNi alloys on Si," *Journal of applied physics*, 93(10), 2003, pp. 6154-6158.

K) Matweb Material Datasheet for TiN coatings. Accessed on May 4, 2022. URL: https://www.matweb.com/search/datasheet_print.aspx?matguid=ffbf753c500949db95e502e043f9a404

L) A to Z of Materials Datasheet for ASIS 310 Stainless Steel Accessed on May 4, 2022. URL: https://www.azom.com/article.aspx?ArticleID=4392

M) M. Yanasaki, et al., "Thermal diffusivity and conductivity of Zr55Al0Ni5Cu30 bulk metallic glass,"*Scripta Materalia*, 53(1), 2005, pp. 63-67.

N) U, Harms, et al. "Thermal conductivity of Pd40Ni40-xCuxP20 metallic glasses," *Scripta Materialia*, 47(6), 2002, pp. 411-414.

We claim:

1. A thermal sensor device comprising:
   a substrate;
   read-out circuitry;
   a thermal sensor element; and
   at least one conductive leg that constitutes a conductive path of enhanced thermal resistance extending between the thermal sensor element and the read-out circuitry configured for conducting an electrical signal between the thermal sensor element and the read-out circuitry, the at least one conductive leg having a thermal resistance and comprising an electrically conductive alloy material or intermetallic material of at least two or more elements having an electrical conductivity (o) no less than about $1.9 \times 10^5$ S/m and a thermal conductivity (k) no more than about 22 $Wm^{-1} K^{-1}$.

2. The device of claim 1, wherein the alloy material or intermetallic material is a binary alloy composed of only two elements.

3. The device of claim 1, wherein the alloy material or the intermetallic material is a ternary, quaternary or higher alloy composed of three, four or more elements, wherein the additional element or elements beyond two increase scattering and transport disruption of the phonons through the at least one conductive leg compared to a binary material composed of only two elements.

4. The device of claim 1, wherein the at least one conductive leg is provided as a homogenous film or a trace.

5. The device of claim 1, wherein the material is an intermetallic having a B1, B2, B3, B4, B10, B17, B19 or B20 crystal packing structure.

6. The device of claim 1, wherein the alloy material or the intermetallic material are formed of only metal atoms.

7. The device of claim 1, wherein the alloy material is clad with a cladding material.

8. The device of claim 1, wherein the thermal resistance and electrical conductivity of the electrically conductive alloy material or the intermetallic material are determined using the Klemens analytical model and the Nordheim rule, respectively.

9. The device of claim 1, wherein the phonon mean free path is greater than the electron mean free path through the conductive path of enhanced thermal resistance.

10. A method for forming the thermal sensor device of claim 1, the method comprising:
    selecting an electrically conductive alloy material or intermetallic material of at least two or more elements to promote scattering of phonons; and
    forming, as part of the at least one conductive leg extending between the thermal sensor element and the read-out circuitry, the phonon transport disrupting structure from the selected electrically conductive alloy material or intermetallic material for conducting an electrical signal between the thermal sensor element and the read-out circuitry.

11. The device of claim 2, wherein the material comprises: $Ni_X Ti_{1-X\ 0.45<x<0.55}$, $Co_X Ga_{1-X\ X \approx 0.5}$, or $Al_X Fe_{1-X\ X \approx 0.5}$, if an intermetallic, or a-NiTi, CuNi, or TiN, if an alloy.

12. The device of claim 3, wherein the material comprises: NiTiHf, NiTiCoHf, or hcp-GeSbTe, if an intermetallic, or $Fe_{0.55}Ni_{0.2}Cr_{0.25}$, $Zr_{0.55}Al_{0.1}$ $Ni_{0.05}Cu_{0.3}$, $Pd_{0.4}Ni_{0.4}P_{0.2}$, if a binary alloy.

13. The device of claim 8, wherein the thermal resistance of the electrically conductive alloy material or the intermetallic material is determined according to the following equation:

$$\frac{k_L}{k_0} = \frac{\tan^{-1} u}{u}, \text{ where } u = \left(\frac{(6\pi^5 V^2)^{\frac{1}{3}}}{2 k_B v_s} k_0 \Gamma\right)^{1/2}, \text{ where } \Gamma = \frac{\langle \Delta M^2 \rangle}{\langle M^2 \rangle}, \langle \Delta M^2 \rangle$$

is the average mass variance, $\langle M^2 \rangle$ is the average mass squared, $k_0$ is the thermal conductivity of a pure material, $k_L$ is the lattice thermal conductivity of the alloy, V is the volume of a unit cell of the compound, and $v_s$ is the average speed of sound in the material.

14. The device of claim 8, wherein the electrical conductivity of the electrically conductive alloy material or the intermetallic material is determined according to the following equation:

$$\sigma = \frac{1}{CX(1-X)},$$

where C is the Nordheim coefficient of one material in a solution of the other and X is the atomic fraction of the element being added to the solution.

15. The device of claim 14, wherein for material concentrations beyond the solubility limit, two phase solutions exist, determined according to the following equation:

$\sigma = \sigma_A X + \sigma_B (1-X)$, where $\sigma_A$ and $\sigma_B$ are the electrical conductivity of a first material A and second material B, respectively.

16. The device of claim 9, wherein the thickness of the conductive path of enhanced thermal resistance is determined by a Fuchs-Sondheimer solution.

17. The device of claim 16, wherein a thickness $d_{film}$ of the conductive path of enhanced thermal resistance is determined is according to the following equations:

$$\frac{k_{film}}{k_{bulk}} = 1 - \frac{3\xi_{phonon}(1-p)}{2} \int_0^1 (\mu - \mu^3) \frac{1 - \exp\left(-\frac{\xi_{phonon}}{\mu}\right)}{1 - p\exp\left(-\frac{\xi_{phonon}}{\mu}\right)} d\mu,$$

where $k_{film}$ is the thermal conductivity of the thin film, $k_{bulk}$ is the corresponding bulk thermal conductivity, p is the fraction of energy carriers specularly reflected at the interface, $\mu$ is a variable of integration, and $\xi_{phonon} = d_{film}/\Lambda_{phonon}$, where $\Lambda_{phonon}$ is the phonon mean free path; and $$\frac{\sigma_{film}}{\sigma_{bulk}} = 1 - \frac{3\xi_{electron}(1-p)}{2} \int_0^1 (\mu - \mu^3) \frac{1 - \exp\left(-\frac{\xi_{electron}}{\mu}\right)}{1 - p\exp\left(-\frac{\xi_{electron}}{\mu}\right)} d\mu,$$

where $\sigma_{film}$ a is the electrical conductivity of the thin film, $\sigma_{bulk}$ is the corresponding bulk electrical conductivity, p is the fraction of energy carriers specularly reflected at the interface, $\mu$ is a variable of integration, and $\xi_{electron} = d_{film}/\Lambda_{electron}$, where $\Lambda_{electron}$ is the electron mean free path.

18. The device of claim 17, wherein the thickness d is selected so that $\Lambda_{phonon} > d_{film} > \Lambda_{electron}$.

19. The device of claim 17, wherein $\Lambda_{electron}$ is 3 nm and $\Lambda_{phonon}$ is 30 nm; and p is 0.

20. The method of claim 10, wherein the selecting of an electrically conductive alloy material or intermetallic material includes: selecting the electrically conductive alloy material or intermetallic material to have a thermal conductivity (k) no more than about 22 $Wm^{-1} K^{-1}$ and an electrical conductivity ($\sigma$) no less than about $1.9 \times 10^5$ S/m.

21. The method of claim 10, wherein the forming of the phonon transport disrupting structure includes: forming a film by: physical vapor deposition; chemical vapor deposition, evaporation, epitaxial growth, pulsed laser deposition, selective laser melting/sintering, or arc melt spinning.

22. The method of claim 10, wherein the at least one conductive leg is a conductive trace which is patterned and etched or milled.

* * * * *